US011627246B2

United States Patent
Arikuma et al.

(10) Patent No.: US 11,627,246 B2
(45) Date of Patent: Apr. 11, 2023

(54) CAMERA ADJUSTMENT APPARATUS, CAMERA POSITION ADJUSTMENT METHOD, AND COMPUTER READABLE MEDIUM

(71) Applicant: NEC Corporation, Tokyo (JP)

(72) Inventors: Takeshi Arikuma, Tokyo (JP); Takatoshi Kitano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 23 days.

(21) Appl. No.: 17/441,824

(22) PCT Filed: Mar. 27, 2019

(86) PCT No.: PCT/JP2019/013093
§ 371 (c)(1),
(2) Date: Sep. 22, 2021

(87) PCT Pub. No.: WO2020/194564
PCT Pub. Date: Oct. 1, 2020

(65) Prior Publication Data
US 2022/0201193 A1     Jun. 23, 2022

(51) Int. Cl.
*H04N 5/232*     (2006.01)
*G06T 7/73*     (2017.01)
*H04N 5/235*     (2006.01)

(52) U.S. Cl.
CPC .......... *H04N 5/23218* (2018.08); *G06T 7/73* (2017.01); *H04N 5/2351* (2013.01);
(Continued)

(58) Field of Classification Search
CPC ............... H04N 5/232; H04N 5/23299; H04N 5/23218; H04N 5/23296; H04N 5/2351;
(Continued)

(56) References Cited

U.S. PATENT DOCUMENTS 7,916,893 B2 *   3/2011   Kouno ............... G06V 10/225
                                                     701/28
8,532,433 B2 *   9/2013   Kuraki ................ G06T 11/60
                                                     283/73
(Continued)

FOREIGN PATENT DOCUMENTS

JP     2004-187140 A     7/2004
JP     2007-17424 A     1/2007
(Continued)

OTHER PUBLICATIONS

International Search Report for PCT Application No. PCT/JP2019/013093, dated Jun. 18, 2019.

*Primary Examiner* — Pritham D Prabhakher
(74) *Attorney, Agent, or Firm* — Sughrue Mion, PLLC

(57) ABSTRACT

Camera adjustment apparatuses are arranged in an area to be recognized by a camera that captures an image of an object to be recognized, and include: an adjustment mark position detection unit to detect adjustment marks for extracting subject information including a size, a direction, and luminance from an image captured by the camera and detect positions of the detected adjustment marks in the captured image; a subject information extraction unit to extract the subject information from the adjustment marks detected by the adjustment mark position detection unit; and a recognition feasibility determination unit to determine whether each of the adjustment marks detected by the adjustment mark position detection unit can be recognized by comparing the corresponding subject information with a predetermined determination criterion, and generate adjustment information for adjusting the camera based on subject information that corresponds to one of the adjustment marks.

9 Claims, 17 Drawing Sheets

(52) U.S. Cl.
CPC ..... *H04N 5/23296* (2013.01); *H04N 5/23299* (2018.08); *G06T 2207/30204* (2013.01)

(58) Field of Classification Search
CPC ... G06T 7/70; G06T 7/73; G06T 2207/10016; G06T 2207/30232; G06T 2207/30204; G06T 2207/30196; G06T 2207/30201
USPC .................................................... 348/222.1
See application file for complete search history.

(56) References Cited

U.S. PATENT DOCUMENTS

| | | | | |
|---|---|---|---|---|
| 8,594,376 | B2* | 11/2013 | Ogasawara | G06T 7/136 |
| | | | | 382/103 |
| 8,934,667 | B2* | 1/2015 | Osman | H04N 21/44008 |
| | | | | 382/103 |
| 9,292,974 | B2* | 3/2016 | Kaino | G06T 7/73 |
| 10,248,881 | B2* | 4/2019 | Ikeda | G06V 10/20 |
| 10,319,110 | B2* | 6/2019 | Ishikawa | G06K 19/00 |
| 10,824,900 | B2* | 11/2020 | Ikeda | G06V 10/20 |
| 2009/0010496 | A1* | 1/2009 | Saito | G06T 7/74 |
| | | | | 382/106 |
| 2014/0225919 | A1* | 8/2014 | Kaino | G06T 7/73 |
| | | | | 345/633 |
| 2015/0260505 | A1* | 9/2015 | Nagano | H04N 5/222 |
| | | | | 348/135 |
| 2015/0288956 | A1 | 10/2015 | Mallet et al. | |
| 2017/0277968 | A1 | 9/2017 | Ikeda | |
| 2019/0122374 | A1* | 4/2019 | Estebecorena | G06T 7/292 |
| 2019/0188515 | A1* | 6/2019 | Ikeda | G06V 10/245 |
| 2021/0012139 | A1* | 1/2021 | Ikeda | G06V 10/40 |

FOREIGN PATENT DOCUMENTS

| | | |
|---|---|---|
| JP | 2013-9202 A | 1/2013 |
| JP | 2013-24656 A | 2/2013 |
| WO | 2016/031190 A1 | 3/2016 |

* cited by examiner

Fig. 4
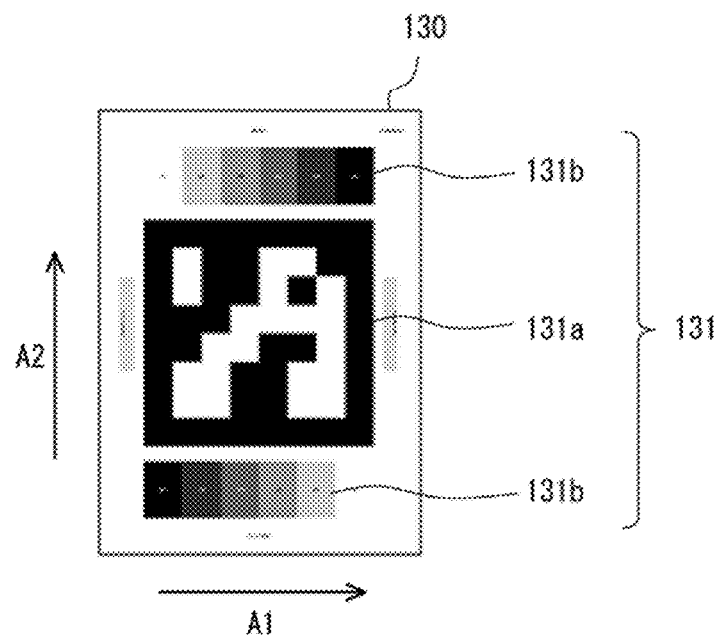
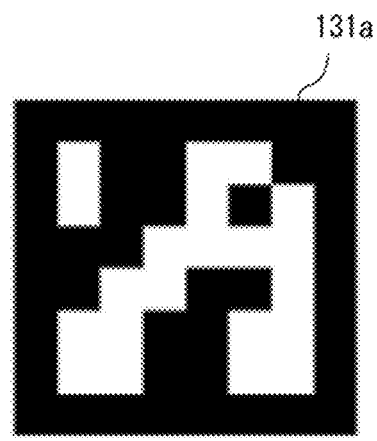
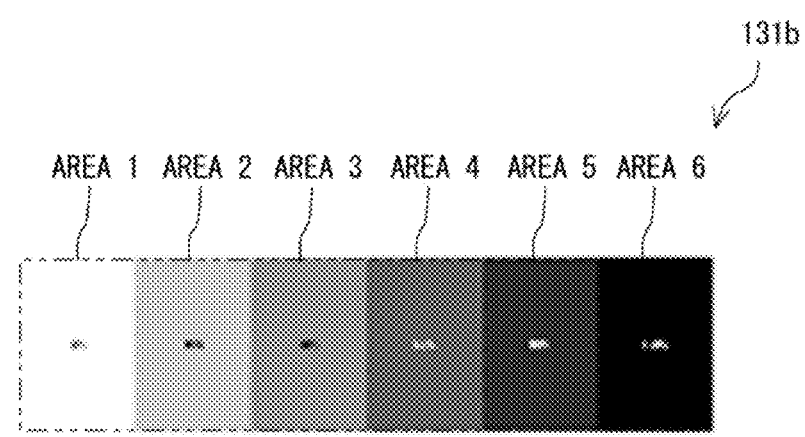

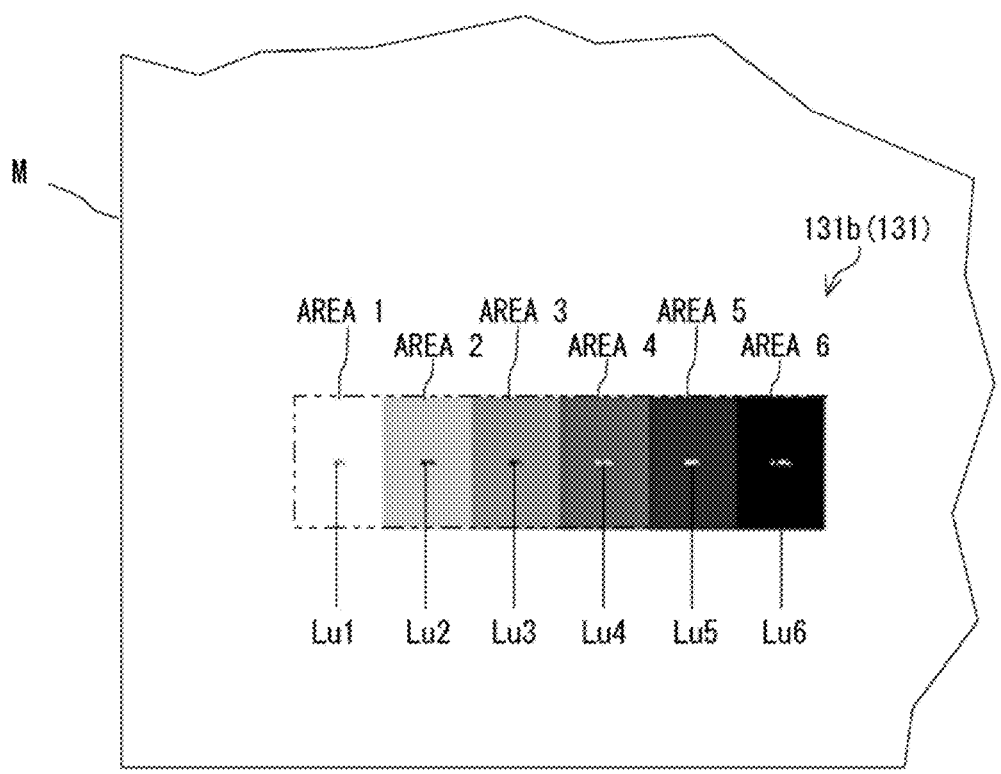
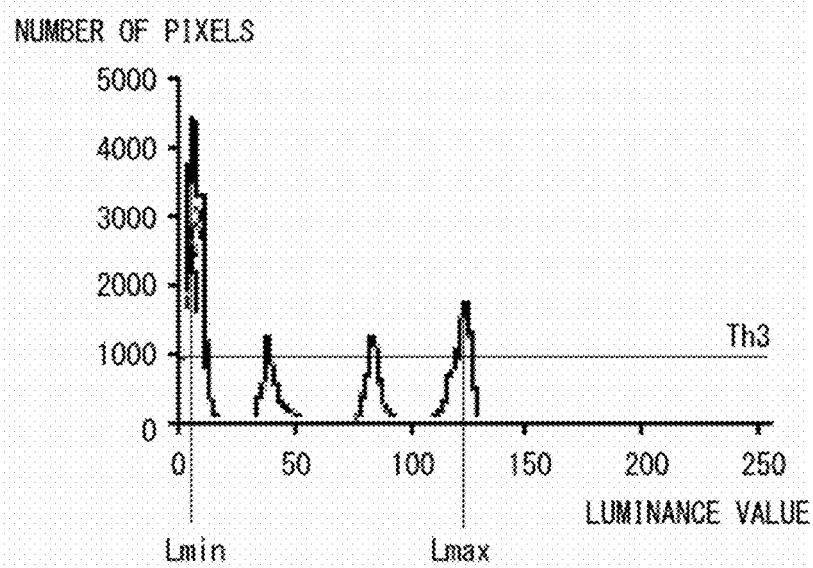
Fig. 9

DETERMINATION CRITERION TABLE

| DETERMINATION CRITERION ID | SIZE (width) | DIRECTION | | | BRIGHTNESS |
|---|---|---|---|---|---|
| | | yaw | pitch | roll | |
| K1 | 20<width<200 | -10<yaw<10 | -10<yaw<10 | -10<yaw<10 | LUMINANCE HISTOGRAM:Lmax<150, Lmin<30, Th3=5% NUMBER OF AREAS THAT CAN BE DISTINGUISHED>4 (Th4=10) |
| K2 | 50<width<400 | -60<yaw<60 | -60<yaw<60 | -60<yaw<60 | LUMINANCE HISTOGRAM:Lmax<150, Lmin<30, Th3=5% NUMBER OF AREAS THAT CAN BE DISTINGUISHED>4 (Th4=10) |

Fig. 10

ADJUSTMENT MARK DETECTION INFORMATION TABLE

| ADJUSTMENT MARK DETECTION ID | TIME | POSITION OF ADJUSTMENT MARK IN CAPTURED IMAGE |
|---|---|---|
| M1 | 2019/1/30 12:00:01 | (55.5, 476) |
| M2 | 2019/1/30 12:00:02 | (66, 490) |
| M3 | 2019/1/30 12:00:03 | (70.5, 500) |

Fig. 11

SUBJECT INFORMATION TABLE

| ADJUSTMENT MARK DETECTION ID | SIZE | DIRECTION | | | BRIGHTNESS |
|---|---|---|---|---|---|
| | WIDTH | yaw | pitch | roll | NUMBER OF AREAS THAT CAN BE DISTINGUISHED |
| M1 | 11 | 2 | 3 | 16 | 5 |
| M2 | 16 | 3 | 5 | 11 | 6 |
| M3 | 21 | 2 | 4 | 5 | 6 |

Fig. 12

ADJUSTMENT MARK DETECTION ID:
SUBJECT INFORMATION IN M1

| | ITEM | VALUE |
|---|---|---|
| SIZE | width | 11 |
| DIRECTION | yaw | 2 |
| | pitch | 3 |
| | roll | 16 |
| BRIGHTNESS | NUMBER OF AREA THAT CAN BE DISTINGUISHED | 5 |

DETERMINATION CRITERION ID : K1(FACE)

DETERMINATION CRITERION ID : K2(OBJECT)

RESULTS OF DETERMINATION (FACE)

| | ITEM | RESULTS OF DETERMINATION |
|---|---|---|
| SIZE | width | -9 |
| DIRECTION | yaw | ○ |
| | pitch | ○ |
| | roll | 6 |
| BRIGHTNESS | NUMBER OF AREAS THAT CAN BE DISTINGUISHED | ○ |

RESULTS OF DETERMINATION (OBJECT)

| | ITEM | RESULTS OF DETERMINATION |
|---|---|---|
| SIZE | width | ○ |
| DIRECTION | yaw | ○ |
| | pitch | ○ |
| | roll | ○ |
| BRIGHTNESS | NUMBER OF AREAS THAT CAN BE DISTINGUISHED | ○ |

Fig. 13

DETERMINATION RESULT TABLE

| ADJUSTMENT MARK DETECTION ID | DETERMINATION CRITERION ID | SIZE WIDTH | DIRECTION | | | BRIGHTNESS |
| --- | --- | --- | --- | --- | --- | --- |
| | | | yaw | pitch | roll | |
| M1 | K1 | -9 | ○ | ○ | 6 | ○ |
| M1 | K2 | ○ | ○ | ○ | ○ | ○ |
| M2 | K1 | -4 | ○ | ○ | 1 | ○ |
| M2 | K2 | ○ | ○ | ○ | ○ | ○ |
| M3 | K1 | ○ | ○ | ○ | ○ | ○ |
| M3 | K2 | ○ | ○ | ○ | ○ | ○ |

Fig. 14

RESULTS OF DETERMINATION

| SIZE (width) | DIRECTION (yaw) | DIRECTION (pitch) | DIRECTION (roll) | BRIGHTNESS | POSITION (X COORDINATE) | POSITION (Y COORDINATE) |
|---|---|---|---|---|---|---|
| -0.595 | 0.0 | 0.0 | 0.0 | 0.0 | 62.10 | 482.30 |

TRANSFORMATION MATRIX

| | PAN | TILT | ROLL | ZOOM | BRIGHTNESS |
|---|---|---|---|---|---|
| SIZE (width) | 0 | 0 | 0 | -3.36 | 0 |
| DIRECTION (yaw) | 2.1 | 0 | 0 | 0 | 0 |
| DIRECTION (pitch) | 0 | 3.2 | 0 | 0 | 0 |
| DIRECTION (roll) | 0 | 0 | 10 | 0 | 0 |
| BRIGHTNESS | 0 | 0 | 0 | 0 | 1.2 |
| POSITION (X COORDINATE) | 0.06 | 0 | 0 | 0 | 0 |
| POSITION (Y COORDINATE) | 0 | 0.01 | 0 | 0 | 0 |

ADJUSTMENT INFORMATION

| PAN | TILT | ROLL | ZOOM | BRIGHTNESS |
|---|---|---|---|---|
| 3.7 | 4.8 | 6 | 2 | 0 |

Fig. 16

CAMERA ADJUSTMENT APPARATUS, CAMERA POSITION ADJUSTMENT METHOD, AND COMPUTER READABLE MEDIUM

This application is a National Stage Entry of PCT/JP2019/013093 filed on Mar. 27, 2019, the contents of all of which are incorporated herein by reference, in their entirety.

TECHNICAL FIELD

The present disclosure relates to a camera adjustment apparatus, a camera position adjustment method, and a computer readable medium.

BACKGROUND ART

Owing to image recognition technologies, computers are now able to recognize faces, baggage, etc., captured by cameras installed in public facilities such as stations or airports. Patent Literature 1 discloses a technique of acquiring recognition environment information by an adjustment marker disposed at a place within a target area to be recognized by a camera.

CITATION LIST

Non-Patent Literature

[Patent Literature 1] International Patent Publication No. WO 2016/031190

SUMMARY OF INVENTION

Technical Problem

Regarding the technique disclosed in Patent Literature 1, there is a problem that only technicians having expert knowledge can perform an operation of adjusting cameras since an operator who does not have expert knowledge does not know how to adjust the cameras even when this operator is provided with acquired recognition environment information.

The present disclosure has been made in view of the aforementioned circumstances, and aims to provide a camera adjustment apparatus capable of easily performing an operation of adjusting a camera.

Solution to Problem

A camera adjustment apparatus according to a first aspect of the present disclosure includes: an adjustment mark position detection unit configured to detect adjustment marks for extracting subject information including a size, a direction, and luminance from an image captured by a camera that captures an image of an object to be recognized and detect positions of the detected adjustment marks in the captured image; a subject information extraction unit configured to extract the subject information from the adjustment marks detected by the adjustment mark position detection unit; and a recognition feasibility determination unit configured to determine whether each of the adjustment marks detected by the adjustment mark position detection unit can be recognized by comparing the corresponding subject information with a predetermined determination criterion, and generate adjustment information for adjusting the camera based on subject information that corresponds to one of the adjustment marks detected by the adjustment mark position detection unit that has been determined not to be recognizable and the criterion.

A camera position adjustment method according to a second aspect of the present disclosure includes: a first step of detecting adjustment marks for extracting subject information including a size, a direction, and luminance from an image captured by a camera that captures an image of an object to be recognized and detecting positions of the detected adjustment marks in the captured image; a second step for extracting the subject information from the adjustment marks detected in the first step; and a third step for determining whether each of the adjustment marks detected in the first step can be recognized by comparing the corresponding subject information with a predetermined determination criterion and generating adjustment information for adjusting the camera based on subject information that corresponds to one of the adjustment marks detected by the adjustment mark position detection unit that has been determined not to be recognizable and the criterion.

A non-transitory computer readable medium according to a third aspect of the present disclosure stores a program for causing a computer to execute the following steps: a first step of detecting adjustment marks for extracting subject information including a size, a direction, and luminance from an image captured by a camera that captures an image of an object to be recognized and detecting positions of the detected adjustment marks in the captured image; a second step for extracting the subject information from the adjustment marks detected in the first step; and a third step for determining whether each of the adjustment marks detected in the first step can be recognized by comparing the corresponding subject information with a predetermined determination criterion and generating adjustment information for adjusting the camera based on subject information that corresponds to one of the adjustment marks detected by the adjustment mark position detection unit that has been determined not to be recognizable and the criterion.

Advantageous Effects of Invention

According to the present disclosure, it is possible to easily perform an operation of adjusting a camera.

BRIEF DESCRIPTION OF DRAWINGS

FIG. 4 is a schematic view showing one example of an adjustment mark;

FIG. 9 is a schematic view for explaining brightness (luminance information) that the subject information extraction unit of the camera adjustment apparatus according to the second embodiment extracts from the adjustment mark;

FIG. 10 is a schematic view showing a determination criterion table for determining whether each of the adjustment marks detected from the captured image can be recognized;

FIG. 11 is a schematic view showing one example of an adjustment mark detection information table output from the adjustment mark position detection unit of the camera adjustment apparatus according to the second embodiment;

FIG. 12 is a schematic view showing one example of the subject information table output from the subject information extraction unit of the camera adjustment apparatus according to the second embodiment;

FIG. 13 is a schematic view showing one example of results of a determination obtained by applying a determination criterion to subject information of the detected adjustment mark;

FIG. 14 is a schematic view showing one example of a determination result table generated by a recognition feasibility determination unit of the camera adjustment apparatus according to the second embodiment;

FIG. 16 is a schematic view for explaining processing of generating adjustment information;

DESCRIPTION OF EMBODIMENT

Hereinafter, with reference to the drawings, embodiments of the present disclosure will be explained. For the sake of clarification of the description, the following descriptions and the drawings are omitted and simplified as appropriate. Throughout the drawings, the same elements are denoted by the same reference symbols, and overlapping descriptions will be omitted as necessary for the sake of clarification of the description.

[First Embodiment]

In the following description, a first embodiment will be explained.

Figure 1:
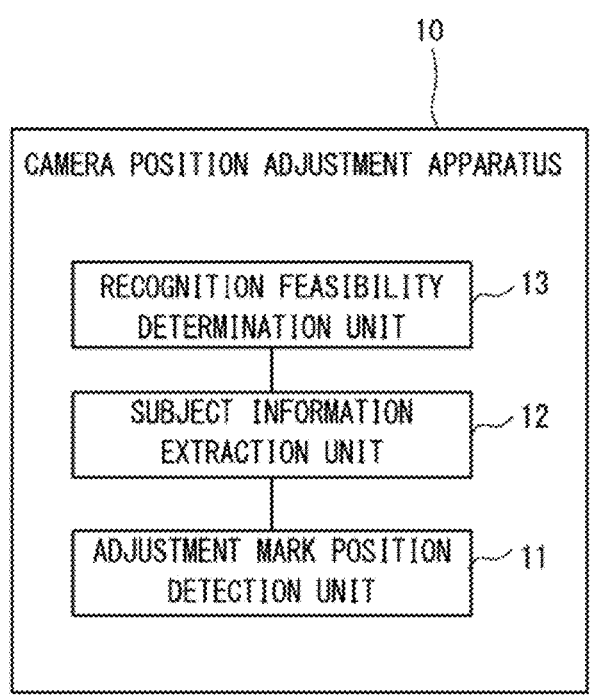
FIG. 1 is a block diagram showing a configuration of a camera adjustment apparatus according to a first embodiment.

FIG. 1 is a block diagram showing a configuration of a camera adjustment apparatus 10 according to a first embodiment. As shown in FIG. 1, the camera adjustment apparatus 10 includes an adjustment mark position detection unit 11, a subject information extraction unit 12, and a recognition feasibility determination unit 13.

The adjustment mark position detection unit 11 detects adjustment marks for extracting subject information including a size, a direction, and luminance from an image captured by a camera that captures images of an object to be recognized, and detects the positions of the detected adjustment marks in the captured image. The subject information extraction unit 12 extracts the subject information from the adjustment marks detected by the adjustment mark position detection unit.

The recognition feasibility determination unit 13 determines whether each of the adjustment marks detected by the adjustment mark position detection unit 11 can be recognized by comparing the corresponding subject information with a predetermined determination criterion. Then the recognition feasibility determination unit 13 generates adjustment information for adjusting a camera based on the subject information that corresponds to one of the adjustment marks detected by the adjustment mark position detection unit that has been determined not to be recognizable and the criterion. Thus, it is possible to easily perform the operation of adjusting the camera.

[Second Embodiment]

In the following description, a second embodiment will be explained.

Figure 2:
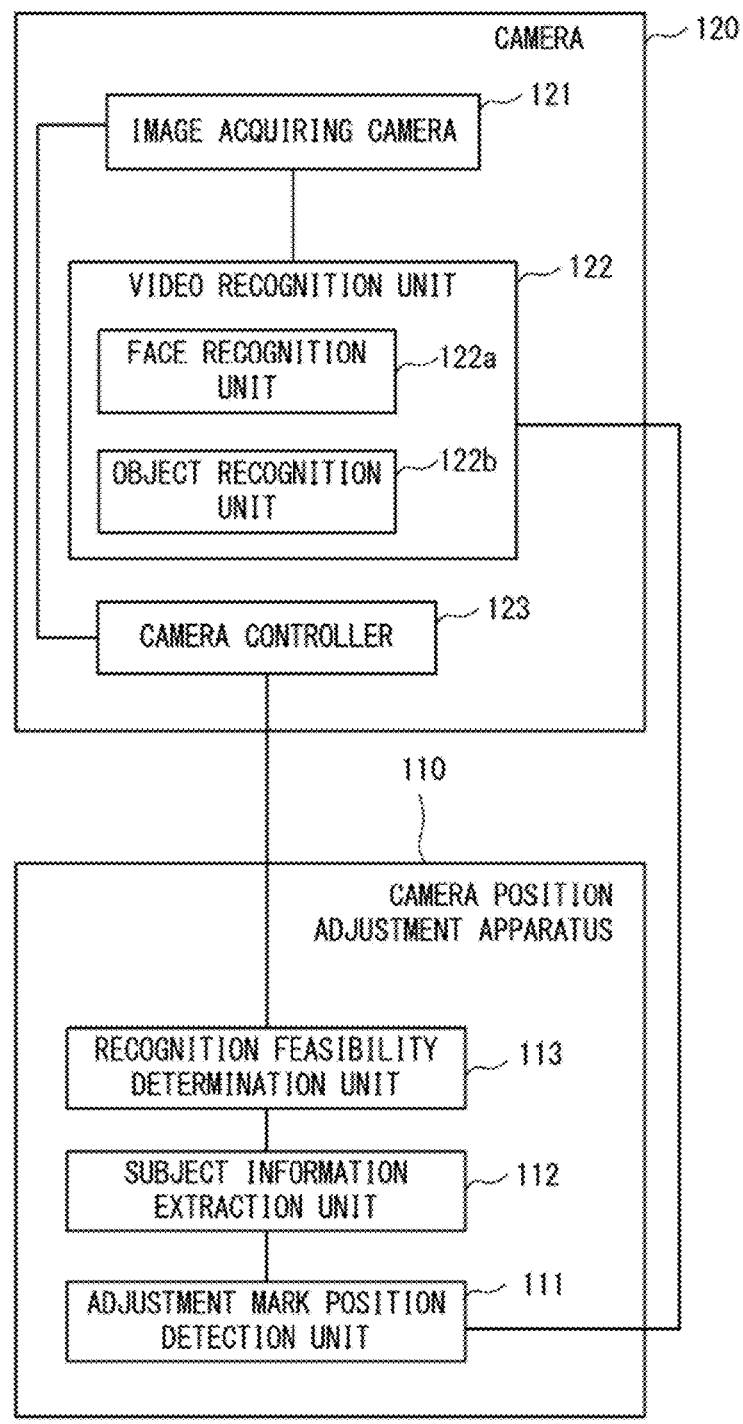
FIG. 2 is a block diagram showing a configuration of a camera adjustment apparatus according to a second embodiment.

First, a configuration example of a camera adjustment apparatus according to the second embodiment will be explained. FIG. 2 is a block diagram showing a configuration of the camera adjustment apparatus 110 according to the second embodiment. The camera adjustment apparatus 110 shown in FIG. 2 generates the adjustment information for adjusting the camera 120.

The camera 120, which captures images of the object to be recognized, includes, for example, an image acquiring camera 121, a video recognition unit 122, and a camera controller 123. The image acquiring camera 121 acquires captured images. The captured image is, for example, a frame image of the captured image. The video recognition unit 122 executes recognition processing on the captured images and recognizes the object to be recognized. The camera controller 123 adjusts the angle of view, zoom, and luminance of the image acquiring camera 121. In the camera 120, the video recognition unit 122 may be integrated with the image acquiring camera 121 and the camera controller 123 or may be formed as a separate apparatus. Further, the camera 120 may not include the camera controller 123. When, for example, a camera that does not have pan/tilt/zoom functions is used, a person who has installed the camera 120 may check the generated adjustment information and manually adjust the angle of view.

The camera adjustment apparatus 110 includes an adjustment mark position detection unit 111, a subject information extraction unit 112, and a recognition feasibility determination unit 113.

The adjustment mark position detection unit 111 detects the adjustment marks and detects the positions of the detected adjustment marks in the captured image. That is, the adjustment mark position detection unit 111 receives the captured image and outputs the positions of the adjustment marks in the captured image. Note that the details of the adjustment marks will be described later.

The subject information extraction unit 112 extracts the subject information from the adjustment marks detected by the adjustment mark position detection unit 111. That is, the subject information extraction unit 112 receives the captured image and the positions of the adjustment marks in the captured image, and outputs the subject information of the adjustment marks.

The recognition feasibility determination unit 113 determines whether each of the adjustment marks detected by the adjustment mark position detection unit 111 can be recognized by comparing the corresponding subject information with a predetermined determination criterion. Then the recognition feasibility determination unit 113 generates the adjustment information for adjusting the camera 120 based on the subject information that corresponds to one of the adjustment marks detected by the adjustment mark position detection unit that has been determined not to be recognizable and the determination criterion. That is, the recognition feasibility determination unit 113 receives the subject information of the adjustment marks and the positions of the adjustment marks in the captured image, and outputs the adjustment information for adjusting the camera 120.

Next, a flow of processing of generating the adjustment information for adjusting the camera 120 in the camera adjustment apparatus 110 will be explained. In the following description, FIG. 2 is also referred to as appropriate.

Figure 3:
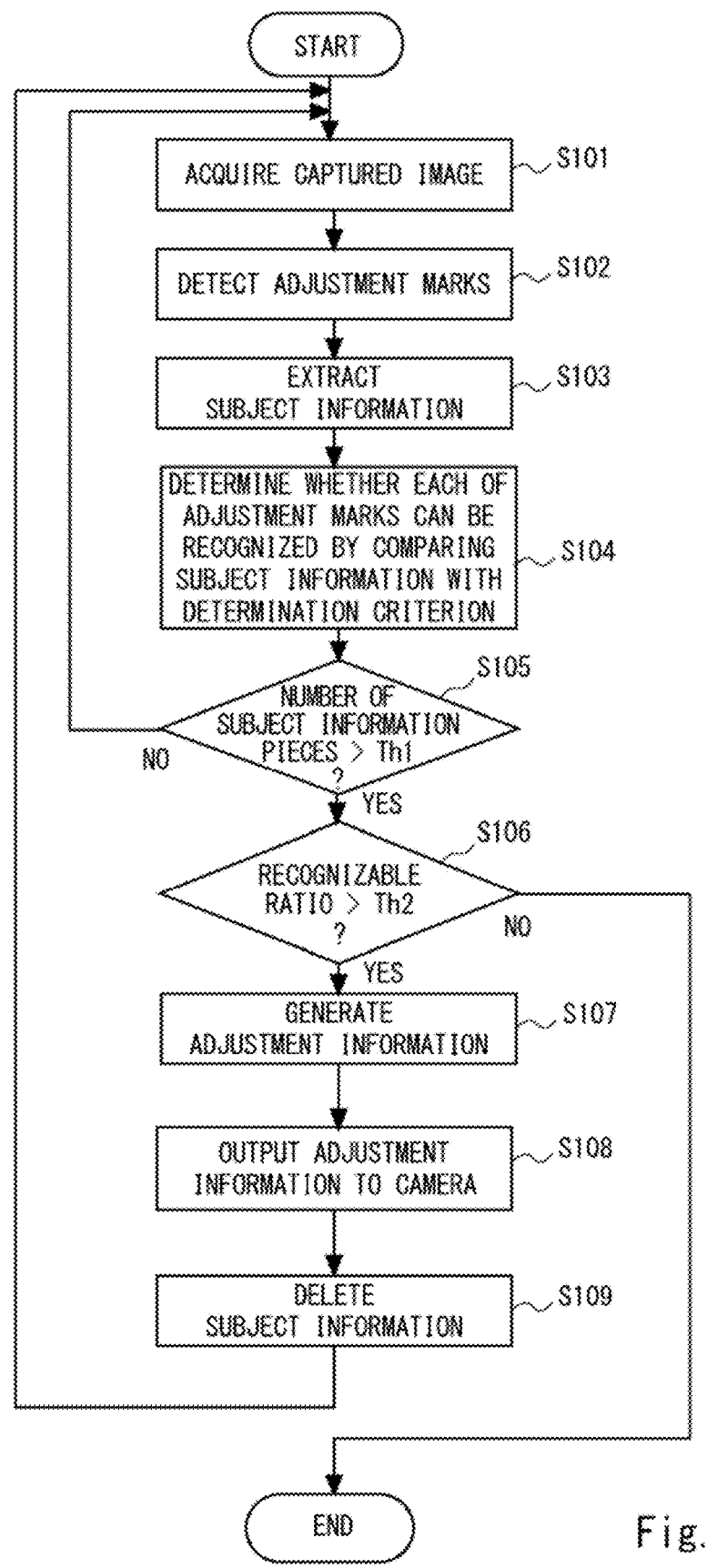
FIG. 3 is a flowchart for explaining a flow of processing of generating adjustment information for adjusting a camera in the camera adjustment apparatus according to the second embodiment.

FIG. 3 is a flowchart for explaining a flow of processing of generating the adjustment information for adjusting the camera 120 in the camera adjustment apparatus 110. As shown in FIG. 3, first, the adjustment mark position detection unit 111 acquires the captured image (Step S101). Next, the adjustment mark position detection unit 111 detects the adjustment marks from the captured image, and detects the positions of the detected adjustment marks in the captured image (Step S102). Then the subject information extraction unit 112 extracts the subject information from the detected adjustment marks (Step S103).

After Step S103, the recognition feasibility determination unit 113 determines whether each of the detected adjustment marks can be recognized by comparing the corresponding subject information with the predetermined determination criterion (Step 104). Next, the recognition feasibility determination unit 113 determines whether the number of subject information pieces that have been extracted is larger than a threshold Th1 (Step S105).

When it is determined in Step S105 that the number of subject information pieces that have been extracted is equal to or smaller than the threshold Th1, the process is returned to Step S101. When it is determined in Step S105 that the number of subject information pieces that have been extracted is larger than the threshold Th1, the recognition feasibility determination unit 113 determines whether a recognizable ratio is larger than a threshold Th2 (Step S106). The recognizable ratio here means a ratio of the number of subject information pieces that have been determined to be recognizable to the total number of all the subject information pieces that have been extracted.

When the recognizable rate is equal to or smaller than the threshold Th2 in Step S106, the process is ended. When the recognizable rate is larger than the threshold Th2 in Step S106, the adjustment information is generated (Step S107).

After Step S107, the recognition feasibility determination unit 113 outputs the generated adjustment information to the camera controller 123 of the camera 120 (Step S108). Next, the recognition feasibility determination unit 113 deletes the subject information of the input adjustment mark (Step S109) and the process returns to Step S101.

Next, the adjustment mark will be explained.

FIG. 4 is a schematic view showing one example of the adjustment mark. As shown in the upper stage of FIG. 4, one or more adjustment boards 130, each of which being a rectangular plate having sides extending in a horizontal direction A1 and a vertical direction A2, are arranged in an area to be recognized by the camera 120 and each include an adjustment mark 131 on the surface thereof. The adjustment mark 131 includes a size/direction adjusting pattern 131a and brightness adjusting patterns 131b.

The middle stage in FIG. 4 shows an enlarged view of the size/direction adjusting pattern 131a. The size/direction adjusting pattern 131a is provided to extract subject information regarding the size and the direction. The design of the size/direction adjusting pattern 131a is a combination of a plurality of straight lines that are extended in the horizontal direction A1 and straight lines that are extended in the vertical direction A2.

The lower stage of FIG. 4 indicates an enlarged view of the brightness adjusting pattern 131b. The brightness adjusting pattern 131b is provided to extract subject information regarding brightness (luminance). A predetermined number of monochromatic areas with different shades are aligned in the brightness adjusting pattern 131b in at least one of the horizontal direction A1 and the vertical direction A2. In this example, the brightness adjusting pattern 131b is aligned in the horizontal direction and the predetermined number is 6. Note that the predetermined number is not limited to 6, and may be any number equal to or larger than 2.

Figure 5:
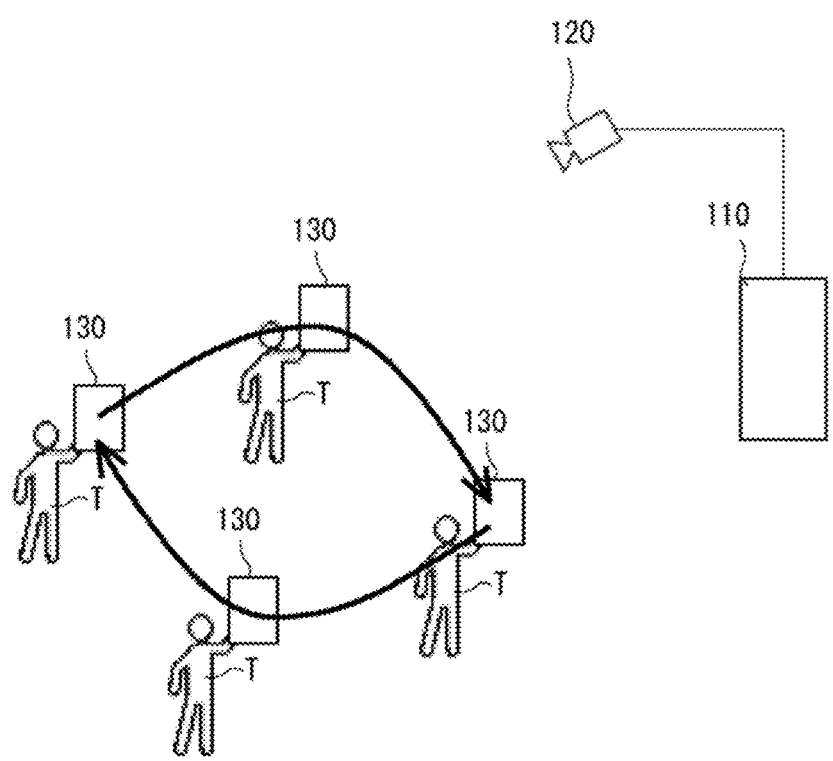
FIG. 5 is a schematic view for explaining installment of adjustment boards including adjustment marks for adjusting a camera.

FIG. 5 is a schematic view for explaining installation of the adjustment boards 130 including the adjustment marks 131 (see FIG. 4) for adjusting the camera 120. When, for example, the object to be recognized by the camera 120 is a "face", as shown in FIG. 5, an operator T holds the adjustment board 130 by his/her hand in such a way that the adjustment board 130 is located in the position of the face. Then the operator T moves as shown in the arrow while holding the adjustment board 130 to cause the adjustment board 130 to thoroughly move in an area to be recognized by the camera 120. The range of the target to be recognized in the captured image can be specified as a range in which the adjustment mark 131 in the adjustment board 130 held by the operator has moved.

In the camera 120, the range of the target to be recognized in the captured image may be set by a user. Further, in the camera 120, the range of the target to be recognized in the captured image may be predetermined.

Next, the position of the adjustment mark 131 (see FIG. 4) in the captured image, the position being detected by the adjustment mark position detection unit 111 (see FIG. 2), will be explained.

Figure 6:
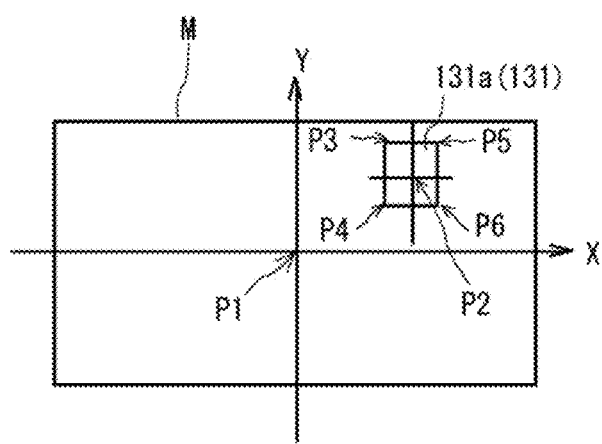
FIG. 6 is a schematic view for explaining the position of the adjustment mark in the captured image that an adjustment mark position detection unit of the camera adjustment apparatus according to the second embodiment detects.

FIG. 6 is a schematic view for explaining the position of the adjustment mark 131 in the captured image detected by the adjustment mark position detection unit 111. As shown in FIG. 6, the position of the adjustment mark 131 in the captured image is expressed, for example, by two-dimensional coordinates (X,Y) of a size/direction adjusting pattern 131a included in the adjustment mark 131, the origin of the coordinates being a central position P1 of the captured image. As shown in FIG. 6, the coordinates of a central position P2 of the size/direction adjusting pattern 131a may be detected or the coordinates of four corners (P3, P4, P5, P6) of the size/direction adjusting pattern 131a may be detected as the position of the adjustment mark 131 in the captured image.

Next, the subject information (size, direction, brightness) of the adjustment mark 131 (see FIG. 4) detected by the subject information extraction unit 112 (see FIG. 2) will be explained.

Figure 7:
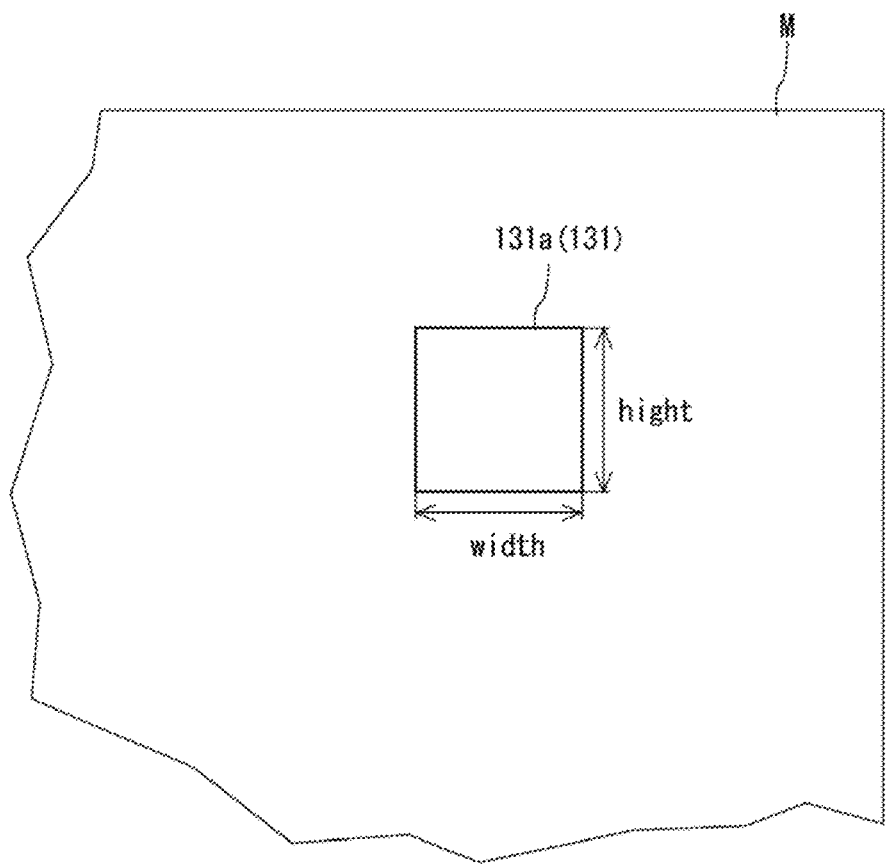
FIG. 7 is a schematic view for explaining a size that a subject information extraction unit of the camera adjustment apparatus according to the second embodiment extracts from the adjustment mark.

FIG. 7 is a schematic view for explaining the size that the subject information extraction unit 112 extracts from the adjustment mark 131. The subject information extraction unit 112 extracts, as the size of the adjustment mark 131, at least one of the width, which corresponds to the number of pixels in the horizontal direction A1, and the height, which corresponds to the number of pixels in the vertical direction A2, of the size/direction adjusting pattern 131a included in the adjacent mark 131 in the captured image M shown in FIG. 7.

Figure 8:
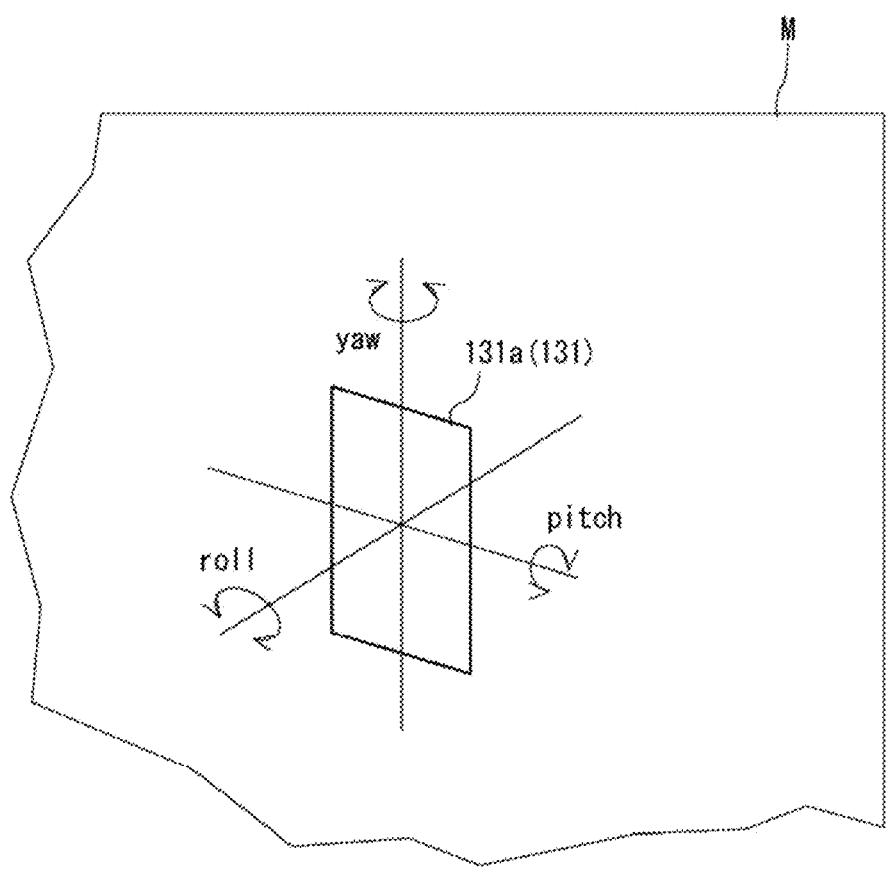
FIG. 8 is a schematic view for explaining a direction that the subject information extraction unit of the camera adjustment apparatus according to the second embodiment extracts from the adjustment mark.

FIG. 8 is a schematic view for explaining the direction that the subject information extraction unit 112 extracts from the adjustment mark 131. As shown in FIG. 8, the subject information extraction unit 112 extracts yaw, pitch, and roll of the size/direction adjusting pattern 131a included in the adjustment mark 131 in the captured image M as the direction of the adjustment mark 131. In this example, yaw indicates the right/left angle (the left side indicates positive and the right side indicates negative), pitch indicates the up/down angle (the upper side indicates positive and the lower side indicates negative), and roll indicates the angle of rotation (the clockwise direction indicates positive and the counterclockwise direction indicates negative).

FIG. 9 is a schematic view for explaining the brightness (luminance information) that the subject information extraction unit 112 extracts from the adjustment mark 131. The subject information extraction unit 112 detects a luminance value for each of all the pixels of the brightness adjusting pattern 131b included in the adjustment mark 131 in the captured image M shown in the upper stage of FIG. 9. Then the subject information extraction unit 112 creates a luminance histogram shown in the lower stage of FIG. 9, in which the horizontal axis indicates a luminance value and the vertical axis indicates the number of pixels, and extracts a maximum value Lmax and a minimum value Lmin of the luminance at the peak of the luminance histogram as the luminance information of the adjustment mark 131. Note that the rate [%] of the number of pixels at the peak with respect to all the number of pixels of the brightness adjusting pattern 131b need to exceed a threshold Th3. In this example, the maximum value Lmax of the luminance at the peak of the luminance histogram is about 120 and the minimum value Lmin thereof is about 5.

Further, as shown in the upper stage of FIG. 9, the central luminance value in the area 1 in the brightness adjusting pattern 131b is denoted by Lu1, the central luminance value in the area 2 is denoted by Lu2, the central luminance value in the area 3 is denoted by Lu3, the central luminance value in the area 4 is denoted by Lu4, the central luminance value in the area 5 is denoted by Lu5, and the central luminance value in the area 6 is denoted by Lu6. The subject information extraction unit 112 calculates the difference Dn (n=5) between the central luminance values in areas adjacent to each other (D1=Lu1−Lu2, D2=Lu2−Lu3, D3=Lu3−Lu4, D4=Lu4−Lu3, and D5=Lu5−Lu6). That is, the subject information extraction unit 112 calculates each of the differences Dn (n=5) between the central luminance values in the areas adjacent to each other and extracts them as the luminance information of the adjustment mark 131.

As described above, the subject information extraction unit 112 extracts, from the brightness adjusting pattern 131b in the captured image M, at least one of the maximum value Lmax and the minimum value Lmin of the luminance at the peak in the luminance histogram and the difference Dn between the central luminance values in the areas adjacent to each other as the luminance information.

Next, processing of determining whether each of the adjustment marks detected from the captured image can be recognized will be explained. In the following description, FIG. 2 is also referred to.

FIG. 10 is a schematic view showing a determination criterion table for determining whether each of the adjustment marks detected from the captured image can be recognized. As shown in FIG. 10, there are two determination criterion IDs, namely, K1 and K2. When, for example, the object to be recognized is a "face", the determination criterion ID: K1 is applied and when the object to be recognized is "baggage", the determination criterion ID: K2 is applied. In this way, the determination criterion for determining whether the adjustment mark can be recognized that corresponds to the object to be recognized is used. Note that the number of determination criterion IDs is not limited to two, and may be one, or more than two. In the determination criterion table, an eligibility range for each of the subject information pieces (size, direction, and brightness) in the detected adjustment mark is defined.

For example, regarding the size of the determination criterion ID: K1, the eligibility range of the width shown in FIG. 7 is −20<width<200. Regarding the direction of the determination criterion ID: K1, the eligibility ranges of yaw, pitch, and roll shown in FIG. 8 are −10<yaw<10, −10<pitch<10, and −10<roll<10, respectively. Regarding the brightness of the determination criterion ID: K1, the eligibility ranges of the maximum value Lmax and the minimum value Lmin of the luminance at the peak in the luminance histogram shown in the upper stage of FIG. 9 are Lmax>150 and Lmin>30. The threshold Th3 is 5%. Further, regarding the brightness adjusting pattern 131b shown in the lower stage of FIG. 9, of the differences (D1, D2, D3, D4, D5) between the central luminance values in the areas adjacent to each other, the ones that are larger than a threshold Th4 (=10) are determined to be the areas that can be distinguished. The eligibility range of the number of areas that can be distinguished is the number of areas that can be distinguished >4.

FIG. 11 is a schematic view showing one example of an adjustment mark detection information table output from the adjustment mark position detection unit 111. As shown in FIG. 11, the adjustment mark detection information table includes adjustment mark detection IDs (in this example, M1, M2, and M3), the time at which the adjustment marks are detected, and the positions of the adjustment marks in the captured image. Now, the positions of the adjustment marks in the captured image are the coordinates of the central position of the size/direction adjusting pattern included in the adjustment mark.

FIG. 12 is a schematic view showing one example of a subject information table output from the subject information extraction unit 112. As shown in FIG. 12, the subject information table includes the adjustment mark detection IDs (in this example, M1, M2, M3), the size (width), the direction (yaw, pitch, roll), and the brightness (the number of areas that can be distinguished).

The recognition feasibility determination unit 113 obtains, for each of the adjustment marks detected by the adjustment mark position detection unit 111, deviations of the size, the direction, and the luminance from the determination criterion in the corresponding subject information. FIG. 13 is a schematic view showing one example of the results of the determinations obtained by applying the determination criteria to the subject information of the detected adjustment mark. As shown in FIG. 13, each of the determination criterion when the object to be recognized is a face (determination criterion ID: K1) and the determination criterion when the object to be recognized is baggage (determination criterion ID: K2) is applied to the subject information in the adjustment mark ID: M1. In general, since it is more difficult to recognize a face than to recognize baggage, the determination criterion ID: K1 is stricter than the determination criterion ID: K2. In the table showing the results of the determinations shown in FIG. 13, circles indicate that the results are within the applicable ranges. When the determination criterion ID: K1 is applied, the items other than the size (width) and the roll are within the applicable range. When the determination criterion ID: K1 is applied, the amount of deviation from the applicable range of the determination criterion is −9 in the size (width) and +6 in the roll. On the other hand, when the determination criterion ID: K2 is applied, all the items are within the applicable range.

FIG. 14 is a schematic view showing one example of a determination result table generated by the recognition feasibility determination unit 113. In the determination result table shown in FIG. 14, circles indicate that the results are within the applicable ranges. The "brightness" in FIG. 14 indicates the number of areas that can be distinguished. As shown in FIG. 14, the determination criteria whose determination criterion IDs are K1 and K2 are applied to each of the adjustment mark IDs M1, M2, and M3. In the adjustment mark ID: M1, when the determination criterion ID: K2 is applied, all the items are within the applicable range. On the other hand, when the determination criterion ID: K2 is applied, the amount of deviation from the applicable range in the size (width) is −9 and the amount of deviation from the applicable range in the roll is +6. In the adjustment mark ID: M2, when the determination criterion ID: K2 is applied, all the items are within the applicable ranges. On the other hand, when the determination criterion ID: K2 is applied, the amount of deviation from the applicable range in the size (width) is −4, and the amount of deviation from the applicable range in the roll is +1. In the adjustment mark ID: M3, all the items are within the applicable ranges in both of the case in which the determination criterion ID: K1 is applied and the case in which the determination criterion ID: K2 is applied.

Figure 15:
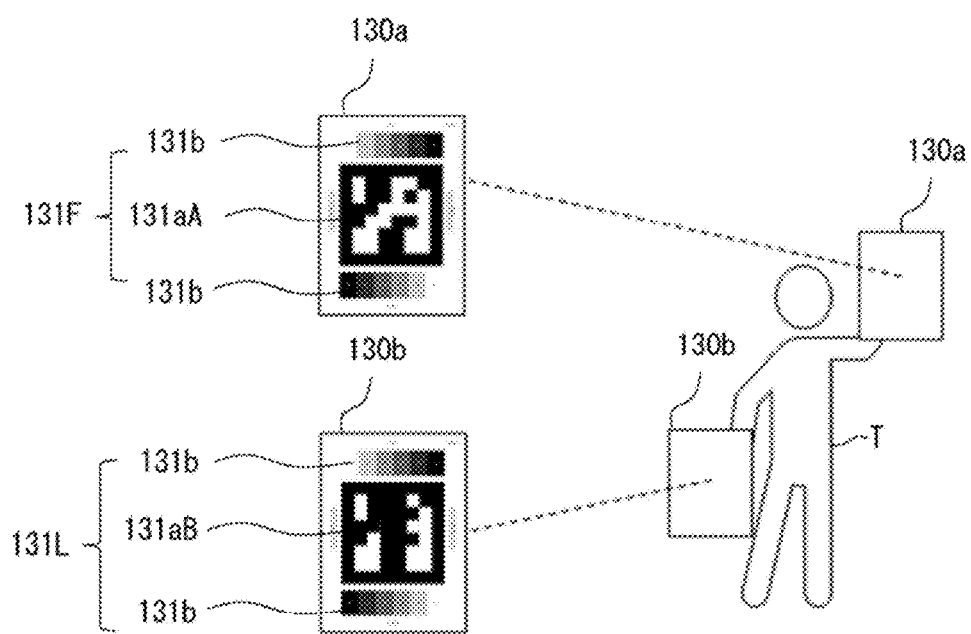
FIG. 15 is a schematic view for explaining an example of using adjustment marks whose designs are different from one another.

FIG. 15 is a schematic view for explaining an example in which adjustment marks whose designs are different from each other are used. As shown in FIG. 15, an adjustment board 130a that includes an adjustment mark 131F is used when the object to be recognized is a "face", and an adjustment mark 131L is used when the object to be recognized is "baggage". The adjustment mark 131F includes a size/direction adjusting pattern 131a A and brightness adjusting patterns 131b. The adjustment mark 131L includes a size/direction adjusting pattern 131a B and brightness adjusting patterns 131b. The design of the size/direction adjusting pattern 131a A and that of the size/direction adjusting pattern 131a B are different from each other. In this way, the design of the adjustment mark to be disposed may vary for each attribute of the object to be recognized. Accordingly, it is possible to easily identify what the target to be recognized of the detected adjustment mark is (in this example, whether the object to be recognized is a "face" or "baggage"). When there are a plurality of determination criteria, like in the example shown in FIG. 14, the design of the adjustment mark to be disposed preferably varies for each attribute of the object to be recognized, whereby it is possible to easily determine which determination criterion to be applied for the detected adjustment mark.

Next, processing of generating the adjustment information will be explained. In the following description, FIG. 2 is also referred to as appropriate.

The recognition feasibility determination unit 113 obtains, for each of the adjustment marks detected by the adjustment mark position detection unit 111, the deviations of the size, the direction, and the luminance from the determination criteria in the corresponding subject information, and then generates the adjustment information in such a way that these deviations are reduced.

FIG. 16 is a schematic view for explaining processing of generating the adjustment information. The "brightness" shown in FIG. 16 indicates the number of areas that can be distinguished. As shown in FIG. 16, in the row vector of the results of the determinations, elements are aligned in the order of the size (width), the direction (yaw), the direction (pitch), the direction (roll), the brightness, the position (X coordinate), and the position (Y coordinate). Note that 0 is input when the results are within the applicable ranges in the row vector of the results of the determinations. In the row vector of the adjustment information, elements are aligned in the order of pan, tilt, roll, zoom, and brightness. When the value of the element is 0 in the row vector of the adjustment information, it is not necessary to perform adjustment for this element. In this example, since the value of the element "brightness" is 0, it is not necessary to adjust the brightness. The transformation matrix is to transform the row vector of the results of the determinations into the row vector of the adjustment information. That is, by multiplying the row vector of the results of the determinations by the transformation matrix, the row vector of the adjustment information can be obtained.

The element "pan" of the row vector of the adjustment information is influenced by the "direction (yaw)" and the position (X coordinate) of the elements of the row vector of the results of the determinations. The element "tilt" of the row vector of the adjustment information is influenced by the "direction (pitch)" and the position (Y coordinate) of the elements of the row vector of the results of the determinations. The element "roll" of the row vector of the adjustment information is influenced by the "direction (roll)" and the position (Y coordinate) of the elements of the row vector of the results of the determinations. The element "zoom" of the row vector of the adjustment information is influenced by the "size (width)" of the elements of the row vector of the results of the determinations. The element "brightness" of the row vector of the adjustment information is influenced by the "brightness" of the elements of the row vector of the results of the determinations. The transformation matrix is formed in such a way that the elements of the row vector of the results of the determinations that has an influence on the element of the row vector of the adjustment information are reflected in the element of the row vector of the adjustment information.

The adjustment information output from the recognition feasibility determination unit 113 is input to the camera controller 123 of the camera 120.

The camera controller 123 automatically performs adjustment of the camera 120 in accordance with the input adjustment information.

In Step S107 in the flowchart shown in FIG. 3, the recognition feasibility determination unit 113 may group the adjustment marks detected by the adjustment mark position detection unit 111 based on the similarity of results of the determinations regarding whether they can be recognized, and generate adjustment information for each group. In this case, final adjustment information is generated based on the adjustment information in all the groups.

Figure 17:
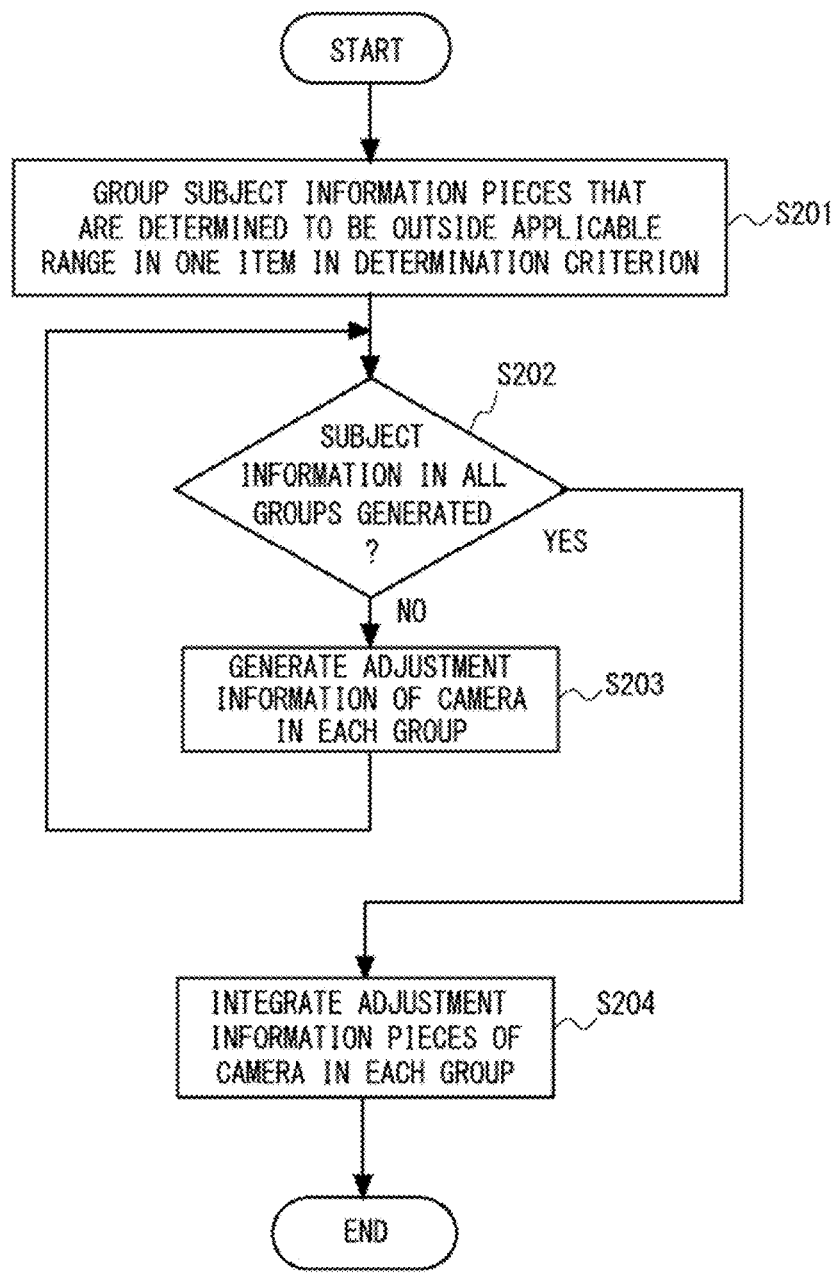
FIG. 17 is a flowchart showing processing of grouping the detected adjustment marks based on the similarity of the results of the determinations in Step S107 in the flowchart shown in FIG. 3.

FIG. 17 is a flowchart showing processing of grouping the detected adjustment marks based on the similarity of the results of the determinations in Step S107 in the flowchart shown in FIG. 3. As shown in FIG. 17, first, the subject information pieces that are determined to be outside the applicable range in one item in the determination criterion are grouped (Step S201). For example, in the determination result table shown in FIG. 14, when the determination criterion ID: K1 is applied, the adjustment mark detection IDs M1 and M2 are determined to be outside the applicable range in each of the size (width) and the direction (roll). When the determination criterion ID: K1 is applied, the adjustment mark detection IDs M1 and M2 are categorized into the same group since the results of the determinations are similar to each other.

After Step S201, it is determined whether all the subject information pieces have been determined (Step S202). When it is determined in Step S202 that there are subject information pieces regarding which the determination has not yet been made, the adjustment information of the camera 120 in each group is generated (Step S203) and the process is returned to Step S202. The adjustment information of the camera 120 in each group is generated by averaging results of the determinations of the subject information included in this group and applying the transformation matrix (see FIG. 10) to the averaged determination result.

When it is determined in Step S202 that all the subject information pieces have been estimated, the adjustment information pieces of the camera 120 in each group are integrated (Step S204). In the processing of integrating the adjustment information pieces of the camera 120 in each group, for example, the adjustment information pieces of the camera 120 in each group is averaged. In the processing of integrating the adjustment information pieces on the camera 120 in each group, the adjustment information pieces in each group may first be weighted in accordance with the importance in the recognition of the object to be recognized and the adjustment information pieces in the group after being weighted may be averaged.

Figure 18:
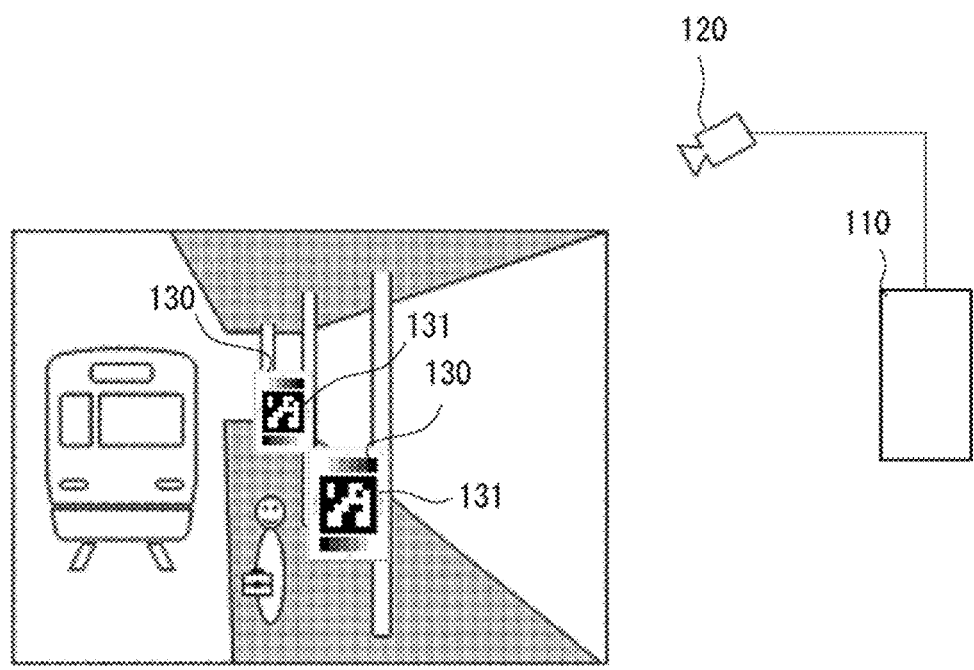
FIG. 18 is a schematic view for explaining a method of adjusting a camera in a case in which the camera is installed in a place where a brightness level varies greatly throughout a day.

When the camera 120 is installed in a place such as an airport or a platform of a station where the brightness level varies greatly throughout a day, the camera 120 needs to be adjusted in accordance with the time zone. FIG. 18 is a schematic view for explaining a method of adjusting the camera 120 in a case in which the camera 120 is installed in a place where the brightness level varies greatly throughout a day. As shown in FIG. 18, the adjustment boards that include the adjustment marks 131 are attached to predetermined positions in the field of view of the camera 120. In this state, the captured images are acquired by the camera 120, for example, at 6 a.m., noon, 6 p.m., and midnight, the adjustment mark 131 is detected for each of the captured images that have been acquired, and the subject information of the adjustment mark is extracted. Then it is determined whether the subject information of the adjustment mark at each time can be recognized, whereby the adjustment information is generated from the results of the determinations. The camera controller 123 of the camera 120 performs, at 6 a.m., noon, 6 p.m., and midnight, adjustment of the camera based on the adjustment information that corresponds to each time. According to the above processing, even when the camera 120 is installed in a place where the brightness level varies greatly throughout a day, it is possible to appropriately recognize the object to be recognized throughout the day.

In the aforementioned second embodiment, the configuration in which the adjustment information generated by the recognition feasibility determination unit 113 of the camera adjustment apparatus 110 is output to the camera controller 123 of the camera 120 has been described (see FIG. 2). Unlike the configuration employed in the second embodiment, a configuration in which the aforementioned adjustment information is output to a display unit such as a monitor may be employed. When the former configuration is employed, the camera controller 123 automatically performs the adjustment of the camera 120 in accordance with the adjustment information that has been input. On the other hand, when the latter configuration is employed, a person manually performs the adjustment of the camera 120 in accordance with the adjustment information displayed on the display unit.

While the present disclosure has been described as a hardware configuration in the aforementioned embodiments, the present disclosure is not limited to this configuration. The present disclosure can achieve each of the processes by causing a Central Processing Unit (CPU) to execute a program.

The program(s) for implementing the aforementioned camera adjustment method can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), CD-Read Only Memory (ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

While the present disclosure has been described with reference to the embodiments, the present disclosure is not limited to the aforementioned embodiments. Various changes that can be understood by those skilled in the art can be made to the configurations and the details of the present disclosure within the scope of the present disclosure.

REFERENCE SIGNS LIST 10, 110 Camera Adjustment Apparatus
11, 111 Adjustment Mark Position Detection Unit
12, 112 Subject Information Extraction Unit
13, 113 Recognition Feasibility Determination Unit
120 Camera
121 Image Acquiring Camera
122 Video Recognition Unit
123 Camera Controller
130 Adjustment Board
131 Adjustment Mark

What is claimed is:

1. A camera adjustment apparatus comprising:
  an adjustment mark position detection unit configured to detect adjustment marks for extracting subject information including a size, a direction, and luminance from an image captured by a camera that captures an image of an object to be recognized and detect positions of the detected adjustment marks in the captured image;
  a subject information extraction unit configured to extract the subject information from the adjustment marks detected by the adjustment mark position detection unit; and
  a recognition feasibility determination unit configured to determine whether each of the adjustment marks detected by the adjustment mark position detection unit can be recognized by comparing the corresponding subject information with a predetermined determination criterion, and generate adjustment information for adjusting the camera based on subject information that corresponds to one of the adjustment marks detected by the adjustment mark position detection unit that has been determined not to be recognizable and the determination criterion.

2. The camera adjustment apparatus according to claim 1, wherein the recognition feasibility determination unit groups the adjustment marks detected by the adjustment mark position detection unit based on the similarity of results of the determinations regarding whether they can be recognized, generates adjustment information for each of the groups, and generates final adjustment information based on the adjustment information in all the groups.

3. The camera adjustment apparatus according to claim 1, wherein the recognition feasibility determination unit obtains, for each of the adjustment marks detected by the adjustment mark position detection unit, deviations of the size, the direction, and the luminance in the corresponding subject information from the determination criterion, and generates adjustment information in such a way that the deviations are reduced.

4. The camera adjustment apparatus according to claim 1, wherein
the direction in the subject information is specified by yaw, pitch, and roll, and
the adjustment information includes pan, tilt, roll, and zoom.

5. The camera adjustment apparatus according to claim 1, wherein the determination criterion of the corresponding adjustment mark varies for each attribute of the object to be recognized.

6. The camera adjustment apparatus according to claim 1, wherein the design of the adjustment mark to be disposed varies for each attribute of the object to be recognized.

7. The camera adjustment apparatus according to claim 1, wherein the adjustment mark includes a brightness adjusting pattern in which a predetermined number of monochromatic areas with different shades are aligned in at least one of a horizontal direction and a vertical direction.

8. A camera adjustment method comprising:
a first step of detecting adjustment marks for extracting subject information including a size, a direction, and luminance from an image captured by a camera that captures an image of an object to be recognized and detecting positions of the detected adjustment marks in the captured image;
a second step for extracting the subject information from the adjustment marks detected in the first step; and
a third step for determining whether each of the adjustment marks detected in the first step can be recognized by comparing the corresponding subject information with a predetermined determination criterion and generating adjustment information for adjusting the camera based on subject information that corresponds to one of the adjustment marks detected in the first step that has been determined not to be recognizable and the determination criterion.

9. A non-transitory computer readable medium storing a program for causing a computer to execute the following steps:
a first step of detecting adjustment marks for extracting subject information including a size, a direction, and luminance from an image captured by a camera that captures an image of an object to be recognized and detecting positions of the detected adjustment marks in the captured image;
a second step for extracting the subject information from the adjustment marks detected in the first step; and
a third step for determining whether each of the adjustment marks detected in the first step can be recognized by comparing the corresponding subject information with a predetermined determination criterion and generating adjustment information for adjusting the camera based on subject information that corresponds to one of the adjustment marks detected in the first step that has been determined not to be recognizable and the determination criterion.

* * * * *